United States Patent [19]

Davis et al.

[11] Patent Number: 4,852,809

[45] Date of Patent: Aug. 1, 1989

[54] PNEUMATIC SPREADER

[75] Inventors: Harold A. Davis, Willmar; Gerald B. Saude, Spicer, both of Minn.

[73] Assignee: Willmar Manufacturing, a division of Waycrosse, Inc., Willmar, Minn.

[21] Appl. No.: 106,492

[22] Filed: Oct. 6, 1987

[51] Int. Cl.$^4$ .............................................. A01C 15/04
[52] U.S. Cl. ..................................... 239/654; 239/672
[58] Field of Search ................ 239/159, 654, 655, 672

[56] References Cited

U.S. PATENT DOCUMENTS

| 4,215,824 | 8/1980 | Weiste | 239/655 |
| 4,218,169 | 8/1980 | Arends | 414/523 |
| 4,253,612 | 3/1981 | Schulze | 239/672 |
| 4,522,340 | 6/1985 | Gandrud | 239/654 |
| 4,561,596 | 12/1985 | Siwersson et al. | 239/687 |
| 4,562,968 | 1/1986 | Widmer et al. | 239/655 |
| 4,569,486 | 2/1986 | Balmar | 239/655 |
| 4,705,220 | 11/1987 | Gandrud et al. | 239/654 |

FOREIGN PATENT DOCUMENTS

| 2924625 | 1/1981 | Fed. Rep. of Germany | 239/654 |
| 3539754 | 6/1986 | Fed. Rep. of Germany | 239/655 |
| 3515362 | 10/1986 | Fed. Rep. of Germany | 239/654 |
| 28060 | of 1912 | United Kingdom | 239/654 |
| 856640 | 12/1960 | United Kingdom | 239/654 |

OTHER PUBLICATIONS

Advertisement: "Tyler M Series Tenders", undated.

Primary Examiner—Andres Kashnikow
Attorney, Agent, or Firm—Fitch, Even, Tabin & Flannery

[57] ABSTRACT

Disclosed is a pneumatic spreader for distributing materials stored in bulk supply in a hopper. The hopper includes an opening for discharging the materials into the upper portion of a chamber which includes a metering roller. A lower portion of the chamber is connected to a forced air supply and includes a distribution channel defining a plurality of flow paths. Nozzles receiving metered material are placed in the distribution panel, with one nozzle corresponding to a particular flow path. Material exits the nozzle immediately adjacent the flow path defined by the distribution panel. Forced air fluidizes the material as it enters the distribution panel in the desired direction of the flow path. Flexible tubing sections defining major portions of the flow panel are connected to the distribution panel. Ends of the flexible tubing sections remote from the distribution panel discharge the material. The free ends of the tubing sections are arranged along a boom to form a preselected pattern. The spreader is mounted to a vehicle for covering relatively large land areas traversed by the vehicle. Also disclosed is a chain belt conveyor in the hopper to aid in dischargiang materials therefrom.

5 Claims, 5 Drawing Sheets

FIG. 10

PNEUMATIC SPREADER

BACKGROUND OF THE INVENTION

1. Field of the Invention

The present invention pertains to apparatus for distributing granular materials and the like over a defined pattern, and in particular pertains to such apparatus mounted to vehicles for traveling over relatively large land areas.

2. Description of the Prior Art

It is frequently desired to distribute materials over a relatively large land area. For example, the agricultural industry has had a longstanding need for efficiently distributing granular or pelletized fertilizers, herbicides or insecticides and the like over agricultural fields in which crops are grown. It is also desirable to sow seeds over the same area to establish the plantings. One of two major types of applicators in use today include an impeller-type rotor which utilizes centrifugal force to propel pelletized or granular material over a broadcast area. However, objectionable edge effects have been encountered where the spray pattern has been interrupted by the vehicle to which the applicator is attached. It has also been found that the materials have not been spread as uniformly as has been desired.

The second general type of applicator uses pneumatic energy or forced air to suspend and spray pelletized or granular materials or the like, rather than imparting a momentum thereto by a spinning rotor. In order to provide a more uniform spread of the material, particularly over large areas, it has been found advantageous to provide a multiple number of flow paths terminating in different points of discharge. One example of an applicator of this type is given in U.S. Pat. No. 4,562,968.

One problem associated with pneumatic spreaders is the pressure drop experienced within the distribution system, caused by fairly long path lengths which the materials must travel before their ultimate discharge in the desired pattern. In addition to long path lengths, multiple connection points of the conduits carrying materials along a particular flow path and the number of corners and crevices included in the flow path also impair the efficient operation of the overall system and frequently have been observed to lead to inconsistent distribution along different flow paths.

Improvements in distribution systems have focused upon reducing the complexity of the cooperating subsystems need to provide a reliable, reasonably uniform material distribution. However, further simplification is still required. In addition to contributing directly to capital investment costs, complex equipment increases the likelihood of breakdown resulting in costly downtime for an equipment user. In addition, it is important that repair parts be readily obtained as needed to reduce downtime and to facilitate regular maintenance of the equipment. If a large number of relatively complex parts are required, it is less likely that parts suppliers will maintain a full inventory of replacement parts, particularly where the supplier supports a number of different models of equipment.

SUMMARY OF THE INVENTION

Accordingly, it is an object of the present invention to provide spreader apparatus for distributing materials at multiple locations in a preselected pattern, comprising a minimum number of inexpensive components which are readily serviceable in the field.

Another object of the present invention is to provide a spreader apparatus having metering and distribution components for mounting to a vehicle which are not adversely affected by vibration of the vehicle as it travels across the area upon which materials are to be applied.

Yet another object of the present invention is to provide spreader apparatus for distributing a bulk supply of materials with improved uniformity and consistency of operation.

These and other objects of the present invention which will become apparent from studying the appended description and drawings are provided by a spreader which distributes materials at multiple locations in a preselected pattern. The spreader includes a hopper for holding a bulk supply of the materials having an opening for discharging the materials therethrough; a forced gas supply; and a chamber disposed adjacent the hopper for receiving discharged materials discharged therefrom. The chamber includes fluidizing distribution means which define a plurality of flow paths for fluidizing discharged materials and for imparting momentum thereto for travel in a preselected direction, so as to distribute the fluidized materials among the plurality of flow paths. Gas inlets are provided to connect the forced gas supply, and the fluidizing distribution means. A plurality of conduits are connected to the fluidized distributor means for directing the materials to multiple locations.

BRIEF DESCRIPTION OF THE DRAWINGS

In the drawings, wherein like elements are referenced alike,

FIG. 1 is a perspective view of a spreader apparatus illustrating aspects of the present invention;

FIG. 2 is a top plan view, partially broken away, showing the spreader apparatus of FIG. 1;

FIG. 3 is a cross-sectional view taken along the line 3—3 of FIG. 2 and looking in the direction of the arrows;

FIG. 4 is a cross-sectional view taken along the line 4—4 of FIG. 2 and looking in the direction of the arrows;

FIG. 5 is fragmentary view of a chain conveyor apparatus of the system taken along the line 5—5 of FIG. 2 and looking in the direction of the arrows;

FIG. 6 is a fragmentary perspective view of a portion of the interior of the spreader apparatus, taken generally at the midsection thereof and looking toward the rear of the apparatus;

FIG. 7 is an exploded perspective view of the chain conveyor of the spreader illustrated in the preceding FIGS.;

FIG. *7a* is an enlarged fragmentary view of the chain belt of FIG. 7;

FIG. 8 is an exploded perspective view of the fluidized distributor portion of the spreader illustrated in the above FIGS.;

FIG. 9 is a fragmentary top plan view of the metering roller and distribution system of the spreader apparatus of the preceding figures; and FIG. 10 is a fragmentary elevational view taken along the lines 10—10 of FIG. 9.

DETAILED DESCRIPTION OF THE PREFERRED EMBODIMENT

Before describing the spreader apparatus of the present invention, a brief introduction, helpful to understanding thereof, will be given. Generally, spreader apparatus of the type to which the present invention is directed, is mounted for mounting to a vehicle, preferably the bed of a truck capable of supporting not only the spreader apparatus but also a bulk quantity of fertilizer, insecticide, seed or the like granular-like materials to be spread over agricultural or other areas of substantial size. The preferred embodiment of the spreader apparatus of the present invention can spread approximately ten tons of material in a single "run", without reloading. As will be seen, the spreader apparatus of the present invention includes a pneumatic fluidizing distribution system utilizing forced air to suspend, fluidize and distribute the materials over a preselected pattern of flow paths as the vehicle traverses a path over the land area to be treated.

Previously, spreaders and other tool equipment for treating soil have been carried at the rear of a vehicle, but the broadcast or application range of spreader equipment and the treatment area for soil-engaging equipment has been somewhat limited. With the advent of strong, lightweight structural materials, booms carrying some of the equipment components can now be mounted transverse to the vehicle axis to create a relatively wide path with each pass of the vehicle. In order to increase the efficiency of treatment with each pass of the vehicle, booms are being made increasingly longer. Booms for material spreaders such as that of the present invention typically assume lengths of 50 feet or more.

With the advent of concentrated, lightweight fertilizers and the like materials, it is especially important that spreader equipment uniformly treat the area to be covered in a consistent manner, not only along a given path of the vehicle but also between various runs of the vehicle during which the vehicle is emptied and subsequently reloaded. As will be seen, the spreader apparatus of the present invention employs a plurality of flexible conduits spaced along the length of each boom, with each conduit broadcasting or otherwise applying material over a relatively small portion of the boom length. It is important that the individual conduits do not interfere with one another and do not perform inconsistently, thereby defeating a uniform application, not only along the boom length, but along the path covered underneath the boom as the vehicle travels in a forward direction. Among other advantages, the present invention provides consistent balanced distribution among the conduits attached to a given boom, even though at the extreme ends of the booms, conduits may be separated 50 feet or more from the vehicle with path lengths of the conduits being even longer. In part, the present invention provides improved distribution by limiting the fluidization and distribution path associated with each conduit and by reducing the number of connections, bends and corners associated therewith.

Referring now to the drawings for purposes of illustrating aspects of the present invention, but not for limitation, a spreader apparatus is generally illustrated at 10. Apparatus 10 includes a hopper 12 which is generally trapezoidal in cross-section having a front wall 14, a rear wall 16 and a hopper axis (not necessarily a longitudinal axis) extending therebetween. In the preferred embodiment, the front wall 14 is positioned adjacent the front of the vehicle on which it is mounted, with reference to the direction of vehicle travel, designated by the arrow 18. It will be readily appreciated by those skilled in the art that the locations of the front and rear walls relative to the configuration or the vehicle or the direction of vehicle travel is arbitrary. As will be seen, in the preferred embodiment the hopper 12 is of generally constant cross-section along the hopper axis and accordingly has a uniform loading of material, assuming the material is free-flowing, as is usually the case.

According to the invention, major, massive components of the material distribution system are located adjacent the forward end of a truck bed, rather than its rearward end. Several advantages result from this arrangement, since the center of weight of the limit is more nearly centralized between the axles of the truck or other vehicle carrying the apparatus, which reduces the load-carrying requirements of the vehicle and thereby lowers the cost and weight of the vehicle. Accordingly, the designation of front and rear walls and the direction of vehicle travel is important for defining this and other advantages afforded by the present invention.

Attached on either side of hopper 12 are booms 22, 24. As illustrated, the booms are attached to apparatus 10 at a generally central location relative to its length (or midway along the hopper axis) and are also located adjacent a bottom portion of the apparatus, which offers the advantages of lowering the center of gravity of the apparatus as much as possible and facilitating a gravity feed, while minimizing the length of conduits required to spread material at the several locations along the boom, as well as reducing pressure loss in the various conduits and components of the distribution system. The primary function of booms 22, 24 is to support a plurality of relatively lightweight flexible conduits or tubing means 26 which are conveniently formed from corrugated plastic tubing of the order of 3 to 5 inches in diameter. Attached to the end of each tubing 26 is a deflector head 28, preferably constructed of sheet metal or plastic sheet and may include a flap-like deflector 30 (see FIGS. 1 and 5). While the booms 22, 24 are illustrated as being generally enclosed with sheet metal or the like, it is to be understood that the booms can also be of an open construction, comprising a framework of interconnected struts and the like members. For example, FIG. 3 illustrates an open boom construction wherein a plurality of structural corners 32 are joined to the corners of a plate 34. Preferably, a spaced series of plates 34 are provided along the lengths of the booms and define therein, an appropriate number of openings 36, through which the flexible tubing sections 26 are inserted to receive spaced support therefrom. Other boom constructions offering alternative means for supporting the plurality of flexible tubing section and their associated flow-direction terminations, are possible. The flexible tubing sections 26 illustrated in FIGS. 1 and 2 have a relatively straight, rigid pipe-like section 38 connecting the tubing to the deflector head 28. This section 38 can be eliminated if desired, with flexible tubing sections 26 attached directly to deflector head 28.

Figures 4, 6:
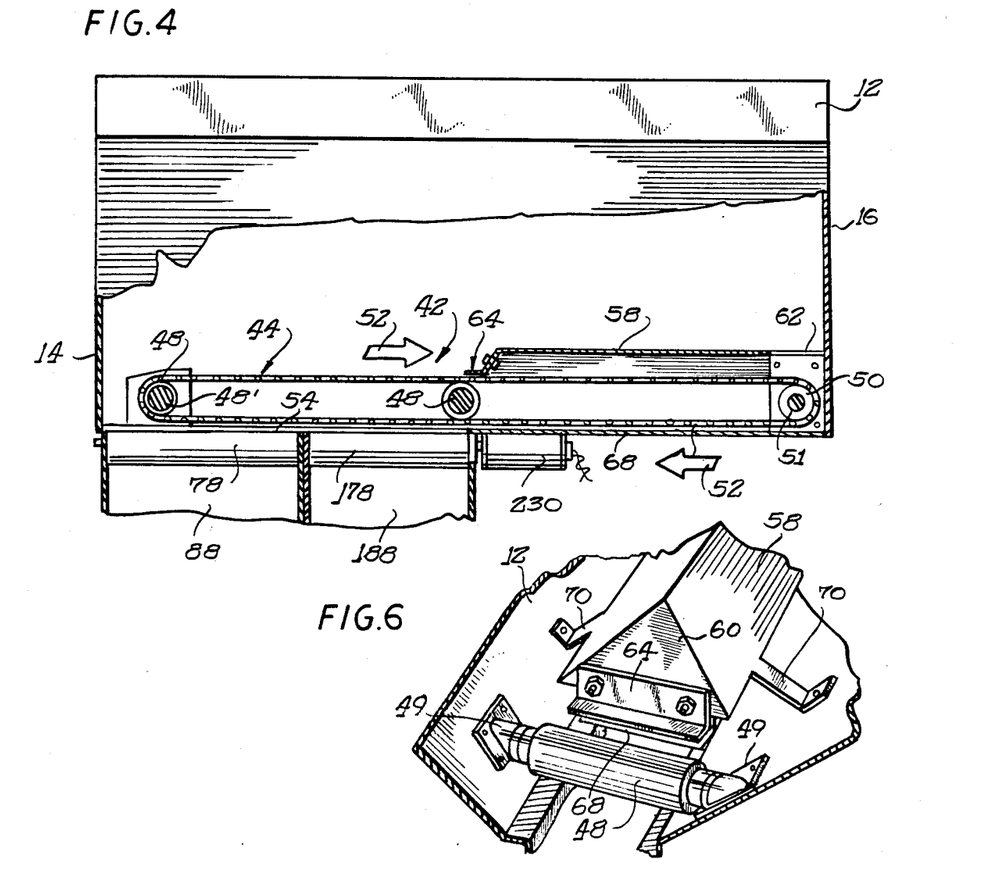

As mentioned above, the interior of hopper 12 is of generally constant cross-section along the axis thereof, that is, between front and rear walls 14, 16. The material distributed by apparatus 10 is typically granular or pelletized but in any event comprises a plurality of relatively small, firm particles (including powders) which can be fluidized (i.e., suspended in air) and blown along a desired path under forced air pressure. As will be seen, the material contained in hopper 12 in a bulk supply is discharged therefrom generally at the forward end thereof. Accordingly, as material is distributed by apparatus 10, a gravity slope will form extending generally from the upper portion of rear wall 12 to the rearwardmost point at which material is discharged from the hopper, which as will be seen is generally located at a midportion of the hopper illustrated in FIG. 4.

Figure 5:
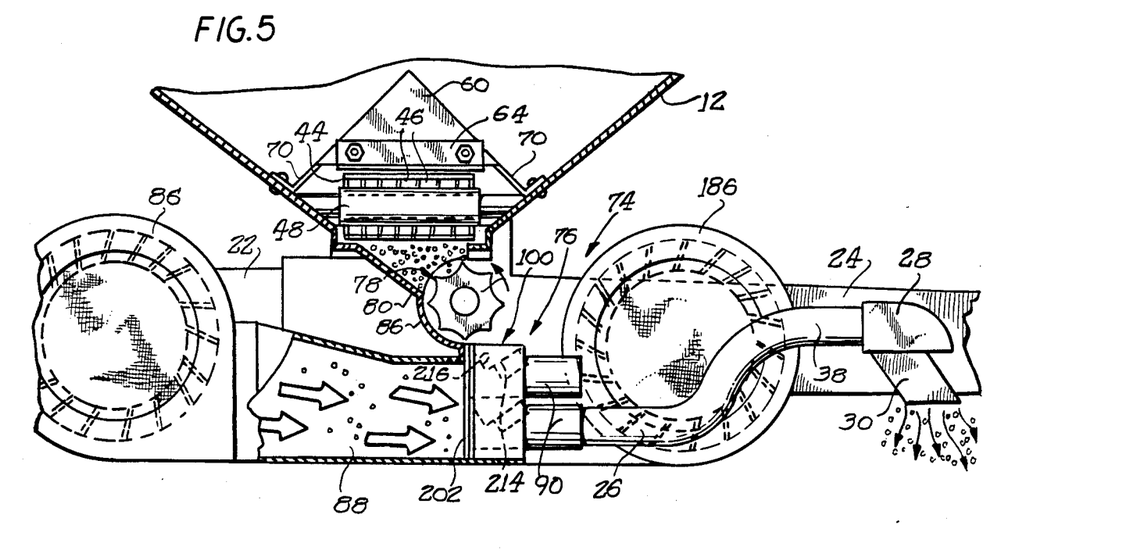
Figures 7, 7A:
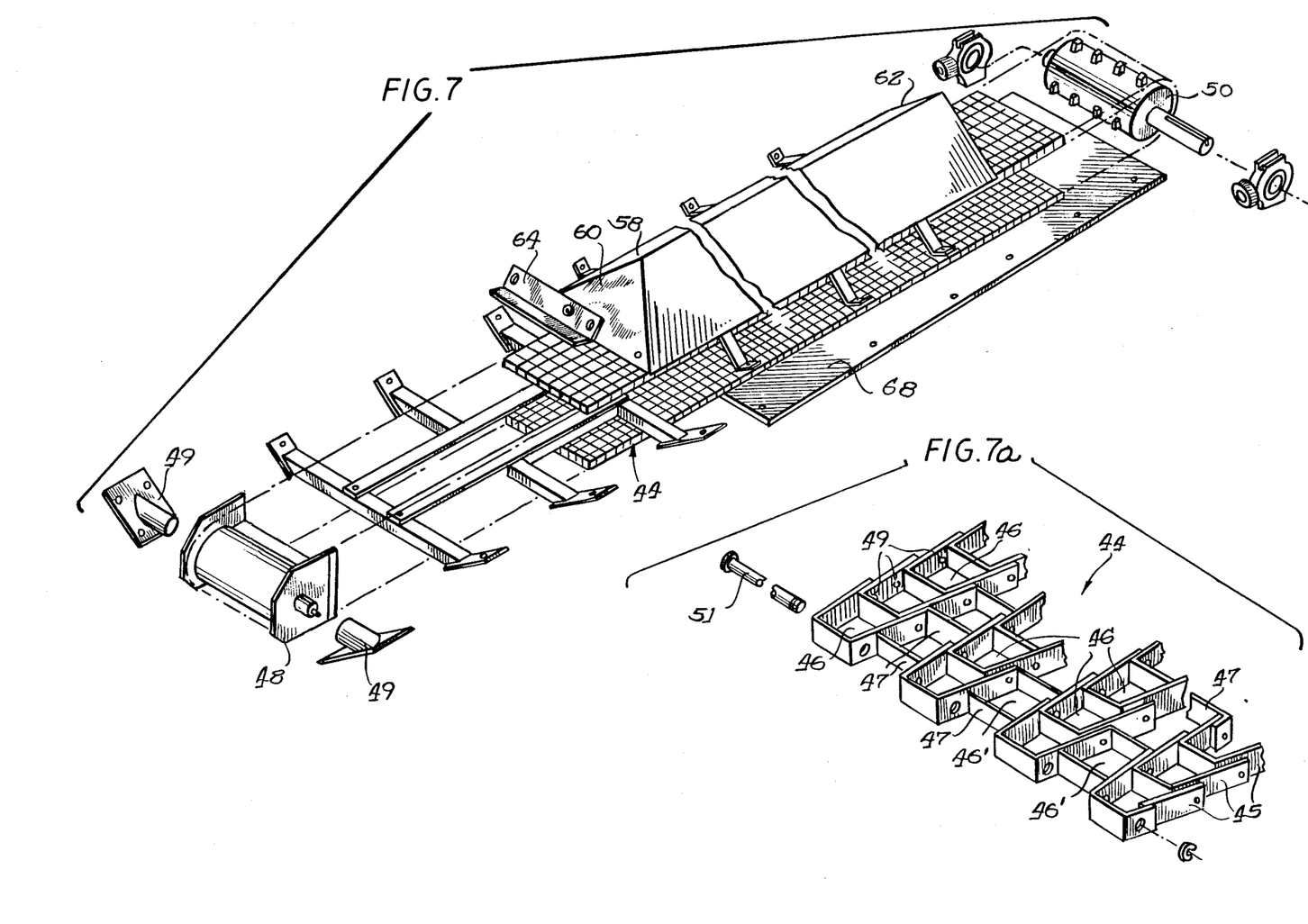

To render this material accessible to the distribution system and to eliminate "rat-holes" which tend to develop at various points in the hopper interior with certain types of materials, a chain conveyor generally indicated at 42 is employed. As best seen in FIGS. 5, 7, and 7a, the chain conveyor is comprised of a chain link belt 44. An important feature of the chain belt 44 is that the links thereof have a substantial height and form cavities or hollow, partially enclosed pocket portions 46 so as to convey material which has fallen or has otherwise been deposited in the enclosed pocket portions. Preferably, the links of the chain belt are formed from metal plates or sheets having a thickness much less than either their height (i.e., thickness of the chain belt) or the dimensions of the cavity they enclose. Preferably, as can be seen most clearly in FIG. 7a, chain belt 44 is comprised of a plurality of serial rows of internested trapezoidal walls 45 joined side-by-side to form a belt of desired width. The walls are generally three-sided, formed of plate or sheet material placed on edge. The fourth, open side of each wall is enclosed by the medial wall portion of a serially adjacent (i.e., upstream or downstream) wall 45. As illustrated, generally U-shaped lateral webs 47 are pinned between laterally adjacent rows of internested walls 45. The pins referred to are designated by the numeral 49, and pivotably interconnect internested walls 45 after an end portion of the U-shaped web is placed therebetween. In effect, the webs form a series of oppositely-directed cavities or hollow pocket portions 46' oppositely directed to the pocket portions 46 formed of internested walls 45. This advantageously allows the chain belt to be operated in forward and reverse directions.

As illustrated herein, the chain link belt is operated in generally horizontal directions, and relies upon an underlying surface to retain granular-like material in the pocket portions 46. As seen, the underlying surface for the upper portion of the chain link belt comprises granular-like material lying below the lower surface of the upper chain link belt portion, which prevents granular material held captive within the pocket portions from falling therethrough. The lower portion of the chain link belt is located adjacent a bottom wall of the hopper, which prevents the material captive within the pocket portions from falling therethrough, in a similar fashion. However, it is also advantageous to use the chain link belt of the present invention in generally vertical directions wherein the material within a pocket portion is supported from below by the internested walls 45.

Referring again to FIG. 7a, the ends of belt 44 are connected together by a pin 51. Other arrangements for connecting series of internested walls 45 is also possible. The chain belt 44 is suspended by relatively smooth roller supports 48 and a toothed or sprocket roller 50 which engages chain belt 44 for clockwise propulsion, indicated by the arrows 52 of FIG. 4. Thus, the lower segment of chain belt 44, that located closest to the discharge opening 54 of hopper 12 is moved in a direction from a point of accumulation of material (herein preferably the rear of the hopper).

The rollers 48 are mounted at either end by roller bearings 49 attached to the side walls of hopper 12. A toothed roller or sprocket 50 is supported by a shaft 51 which, in turn, is rotatably driven by a motor, preferably having reversible directions, for reasons which will be explained herein. While the bottom portion of chain belt 44 transports material toward discharge opening 54, the top portion of that same chain belt would transport material away from the discharge opening if not otherwise prevented from doing so by a hood 58 overlying the rear portion of the chain conveyor 42. Hood 58 preferably has a tapered end 60 adjacent the discharge opening and is attached at its other end 62 to a wall of the hopper, herein the rear wall 16. With hood 58 in place, material having accumulated in the pockets of the exposed upper portion of the chain belt are scraped or otherwise topped off by a diverter blade 64 which limits the amount of material being transported toward the rear of the hopper. It has been observed that portions of many materials of the type distributed by apparatus 10, located above the chain, are "interlocked" with material within the pocket portions, and thus are transported therewith during operation of the apparatus.

With additional reference to FIG. 5, the hood 58 prevents overlying material from entering the upper segment of chain belt 44. As seen most clearly in FIG. 6, the hood 60 is spaced from the bottom wall 68 of the hopper 12 by legs 70. With further reference to FIG. 5, it may be seen that the spacing afforded by legs 70 allows material to enter into the lower segment of chain belt 44, that segment being advanced toward the discharge opening 54. As indicated above, a diverter blade 64 is closely positioned to the upper segment of chain belt 44 so as to scrape off the upper surface thereof, or is slightly spaced thereafter so as to top off or limit the height of material carried on top of the upper segment of the chain belt. As the previously exposed portion of the upper chain belt segment passes under hood 58, it is free to fall into any cavity that may be formed underneath the hood that is not already filled by material flowing underneath the hood through the legs 70. This assures a maximum loading of the forwardly-directed bottom portion of the chain belt segment, thereby ensuring a maximum delivery rate of material to the discharge opening 54, especially when material located would otherwise be unavailable, as when the hopper is nearly empty.

It is preferred that the material in hopper 12 be discharged by gravity into the upper materials inlet portion of chamber 76. However, it is also possible that other arrangements could be provided for presenting material to the discharge opening 54. For example, compartments could be provided in the hopper and a screw auger or conveyor belt or the like could deposit material at the discharge opening. In general, it has been found unnecessary to provide baffle plates internal to hopper 12, and the chain conveyor described herein is preferred for its simplicity of construction and effective, trouble-free operation.

Figure 8:
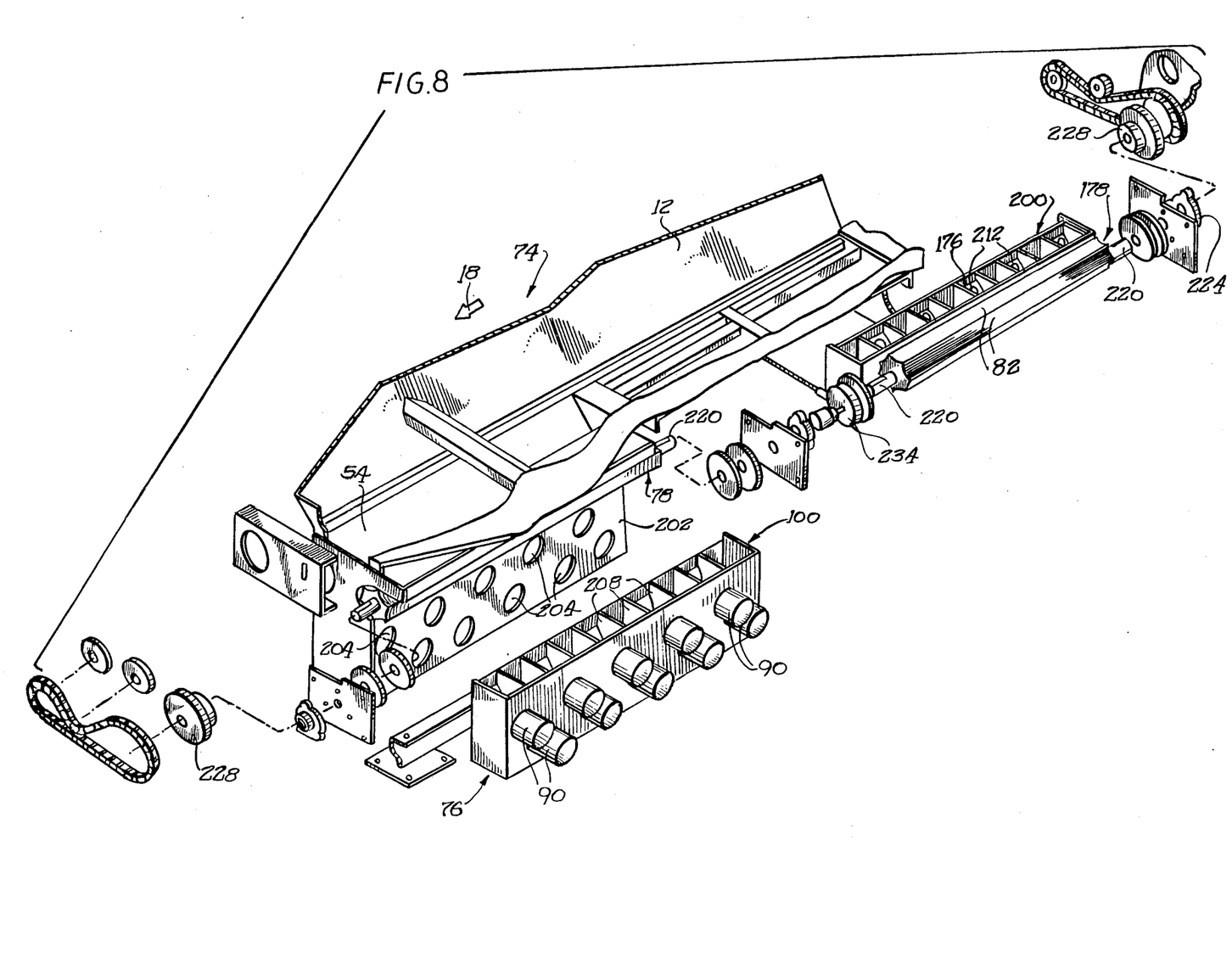
Figure 9:
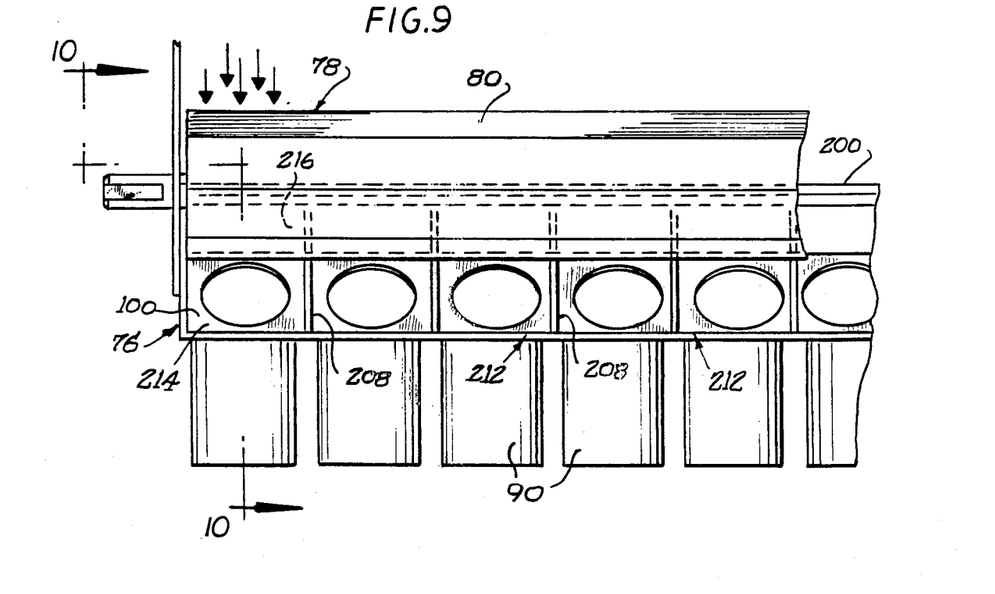
Figure 10:
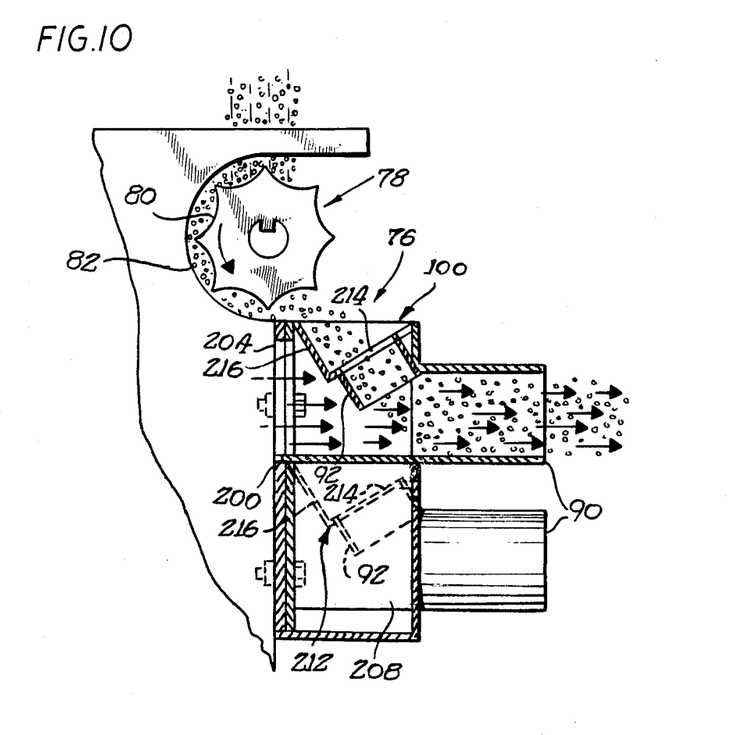

Referring now to FIGS. 5 and 8, the spreader apparatus 10 includes a system 74 for fluidizing, distributing, and pneumatically transporting material into and through flexible tubing sections 26, and ultimately into a generally linear discharge pattern configured along booms 22, 24. Other, nonlinear patterns may be configured along the booms. For example, short supports for carrying tubular sections may extend away from the boom, but such has not been found to be necessary. It is preferred that the distribution system 74 be formed in two separate, substantially identical portions, one associated with each respective boom. Visible in FIG. 5 is a forward distribution portion for feeding the conduits associated with the left-handed boom 24. Located behind the forward distribution system is a rearward distribution system, generally aligned therewith along the hopper axis, for feeding the conduits associated with the other boom 22. Only the forward distribution system visible in FIGS. 1 and 5 will be described herein, it being understood that the rearward distribution system is generally identical thereto, except for being oppositely directed, as will become apparent herein.

Disposed in the upper portion of chamber 76 is a materials inlet region and a metering roller 78 having a generally star-like cross-sectional configuration forming a plurality of metering fins 80. Disposed between fins 80 are groove-like recesses 82 which captivate and transport a defined volume of material as the metering roller rotates about its axis. As will be seen herein, the lower portion of chamber 76, adjacent the forced air inlet, is a fluidized distribution portion which fluidizes materials fed by gravity from the upper inlet region of chamber 76 and distributes those materials between several flow paths through a system of nozzles and outlets to be described herein. It is preferred that the metering rollers effectively block any pressure (positive or negative) that may be developed in chamber 76 from the material in hopper 12, and such blocking is provided by a close engagement between the metering roller and the walls of chamber 76 surrounding the roller. Alternatively, any vacuum developed in chamber 76 could be used to assist in drawing material from hopper 12 into the distribution system and along the booms 22, 24 for discharge in a preselected pattern. It is, however, preferred that the relatively simple and generally more reliable gravity feed and chain conveyor described above be employed to provide a steady controlled quantity of material at the first inlet to chamber 76, adjacent the discharge opening 54.

Associated with chamber 76 is an air supply preferably provided by blower 86 mounted slightly to one side of the hopper axis, namely the left-hand side adjacent boom 24. Blower 86 discharges pressurized air into a gas inlet plenum 88 which provides convenient inlet communication to chamber 76 so that material discharged into the chamber by metering rollers 82 can become fluidized (i.e., suspended in the air flow) and transported through a distribution outlet in a direction generally corresponding to the axis of boom 24. To provide a compact arrangement and to present the most direct path of air flow along the distribution system, the discharge of blower 86 is oriented in a direction generally transverse to the hopper axis, and when taken in plan, a direction most directly aligned with conduits 26.

The outside of chamber 76 includes a plurality of stub-like cylindrical outlet connections over which the free ends of flexible tubing sections can be conveniently attached. The outlet connections 90 preferably extend short distances in the direction of the elongate axis of boom 24, in line with the discharge from blower 86. Projecting immediately upstream of each discharge outlet 90 is a generally cylindrical nozzle 92 formed at a generally downward angle inclined toward the outlets 90. The free ends of nozzles 92, and at least the upper portions thereof partly extend into or are nested in the upstream ends of discharge outlets 90, and accordingly the nozzles 92 are readily visible through the discharge outlets when the flexible tubing is not connected thereto. Material exiting the nozzles 92 is readily fluidized in areas 96 located immediately upstream and adjacent each discharge outlet 90 (see FIG. 5). The material traveling through nozzles 92 is readily fluidized in area 96 by the air flow from blower 86. The fluidized material in area 96 is rapidly and immediately transported through the discharge outlet 90 and along the tubing 26 connected thereto. Accordingly, the residence time of the material exiting nozzles 92 is relatively short as it is fluidized, distributed and directed for transport over a very short distance between the nozzles 92 and discharge outlets 90, a distance of only a few inches in the preferred embodiment. As mentioned above, it is preferred that the material exiting nozzles 92 is presented thereto by a gravity discharge system aided by the metering rollers 78. It is of course possible to provide a distribution system wherein the air flow created by blower 86 generates a vacuum which would provide substantial withdrawal of material from hopper 12, and if necessary, blower 86 could be oversized to provide the amount of vacuum required. It has been found, however, that the gravity feed and metering rollers provide a very reliable consistent distribution of material throughout the discharge pattern of boom 24, without requiring a vacuum assist.

With reference to FIG. 8, chamber 76 is preferably constructed as a discrete manifold subassembly generally designated by the numeral 200. Manifold 200 includes a rear wall 202 having generally oversized inlets 204 associated with each nozzle 92. The inlets are oversized with respect to the internal bore of the nozzles, and is preferably elongated in a vertical direction. Outlets 90 are preferably arranged in upper and lower staggered rows to accommodate a close spacing arrangement. The upper material inlet region of chamber 76 preferably comprises a continuous trough, extending the entire width of manifold 200 (as measured along the hopper axis). Since outlets 90 are preferably arranged in upper and lower staggered rows, and nozzles 92 are closely spaced to the outlets, manifolds 200 preferably include vertical partitions 208 between adjacent nozzles to form a series of upwardly opening rectangular chambers defining an initial entry point into the individual material flow paths. Immediately below the upper row of chamber openings is a double panel plate 212, V-shaped in cross-section. One panel, designated by the reference numeral 214, includes an aperture for mounting the upstream end of nozzle 92 (see FIG. 1). If desired, the nozzles 92 can be blended into the remaining panel 216 to eliminate any buildup of material in the V-shaped crotch formed at the joinder of the two panels. An identical manifold 208 can be used to form the downstream chamber 176. The lower row of outlets 90 are set at lower positions in manifold 200, and accordingly, the rectangular chambers associated therewith are deeper, but receive no more material than the upper, shorter rectangular chambers since the metering rollers distribute a constant concentration of material throughout the entire inlet chamber portion.

Referring again to FIG. 8, two metering rollers 78, 178 are preferably employed, joined end-to-end, in line with the hopper axis. Each roller has a mounting shaft 220 at each end. End mountings 224 are provided at each outer end of the rollers, as are chain sprockets 228 for drive connection to an hydraulic motor 230 (see FIG. 4). The interior ends of the front roller are joined to a rotation sensor 234 or other coupling.

In some applications, it may be necessary to provide balance of the flow of materials among the tubing sections of various lengths supported by boom 24. Accordingly, the size of nozzles 92, the extent to which they are nested within the discharge outlets 90, and the size of the internal bores of the discharge outlets 90, can be individually adjusted to provide an even distribution at the free ends of each conduit supported by a boom 24. It has been found, however, that such adjustment is generally not required and that the pattern of distribution along a boom is substantially uniform and reliably consistent throughout the operation of the apparatus 10.

Figure 1:
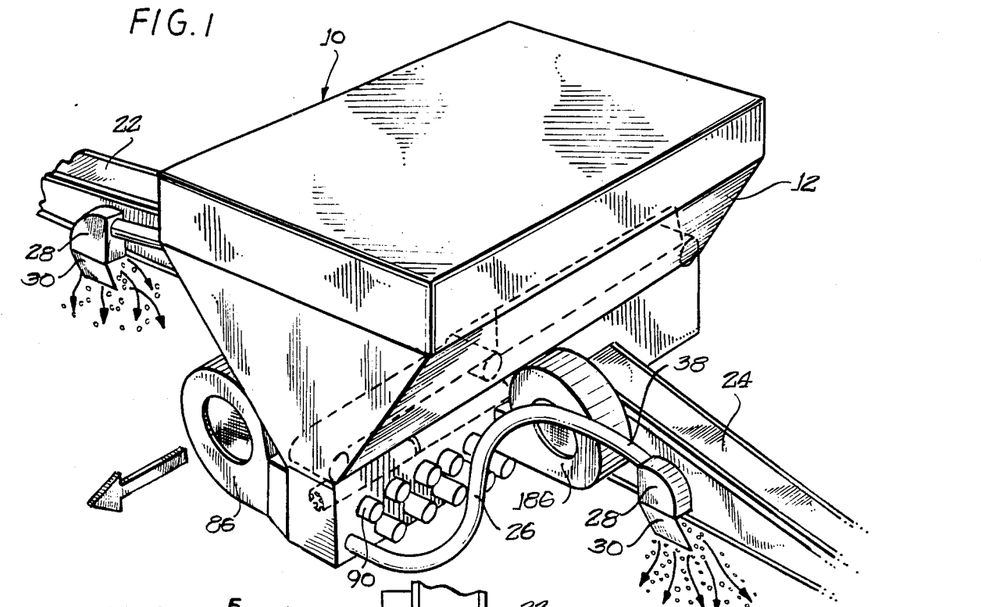
Figures 2, 3:
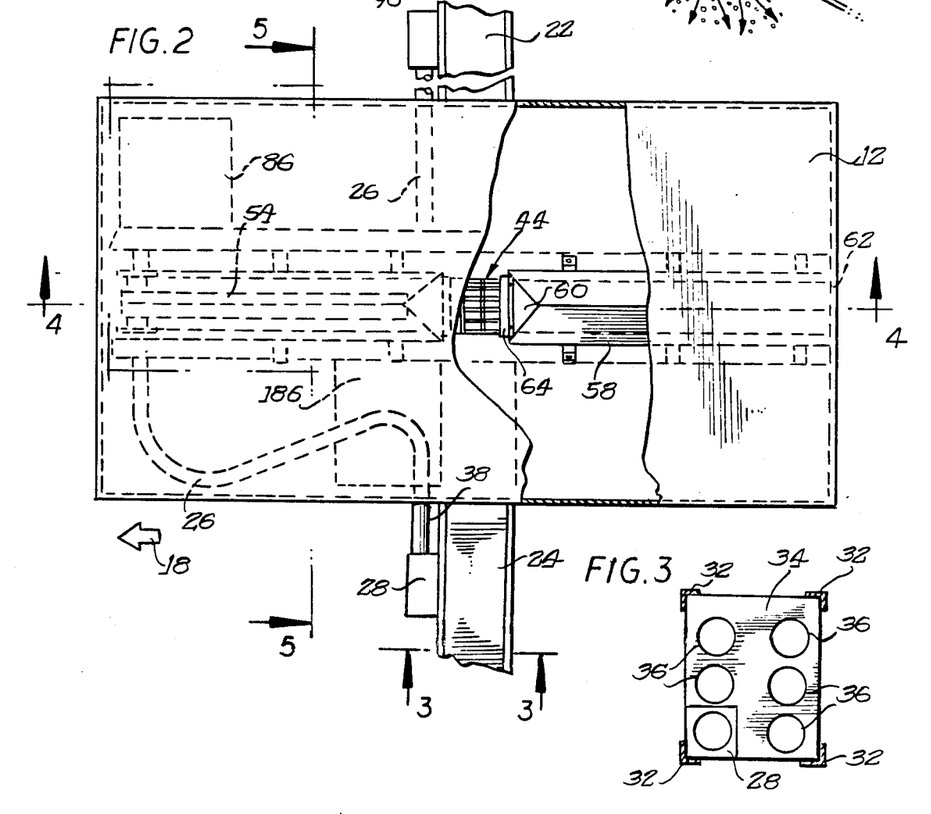

For purpose of clarity, boom 24 is illustrated in FIG. 1 with an exaggerated rearward displacement from the bank of discharge outlet 90. That is, in the preferred embodiment boom 24 is located closer to the discharge outlets than is illustrated. Accordingly, the offsets of conduits 26 along the hopper axis are somewhat less than that indicated in FIG. 1. Also, the radius of curvature of the bends of conduit 26 is, in general, significantly greater than that illustrated in FIGS. 1 and 5, it being a general object in constructing the preferred embodiment that bends in the flexible conduit be minimized in order to further enhance the relatively low pressure drop experienced in a distribution system constructed according to principles of the present invention. Illustrated in the figures is a flexible conduit attached generally to the outside of boom 24. It should be understood that, although not illustrated, other flexible conduits are attached to the remaining discharge outlets 90 are trained within the boom cross-section (through the openings 36 illustrated in FIG. 3) so as to travel along the boom until they are "peeled out" at appropriate locations to achieve the desired discharge pattern along the boom.

The above distribution system has been described for one boom, the left-hand boom 24. The metering roller 78 is generally aligned with the hopper axis, with the blower 86 positioned on the right-hand side of the axis with the chamber 76, nozzles 92, discharge outlets 90, as well as the flexible conduits 26 lying on the opposite side of the hopper axis. The second distribution system associated with the other boom 22 is, as explained above, substantially identical in configuration and composition, but is generally a mirror image with respect to the hopper axis. That is, a second blower 186 is positioned to the left of the hopper axis and directs air flow generally in line with the elongate axis of boom 22. A substantially identical metering roller 178 cooperates with the air flow to suspend material in a second chamber 176 transporting the fluidized material through a second bank of discharge outlets 190 (see FIG. 2) and through flexible tubing attached thereto along boom 22. Thus, the air flows of the two blowers 86, 186 generally oppose each other in directions transverse to the hopper axis, along directions parallel to the elongate axis parallel to their respective boom. This arrangement provides an air flow path of minimum length which reduces the rated blower capacity required by reducing pressure drops and has been found to provide a surprisingly consistent distribution of materials along the boom. In addition, as explained above, the blowers and chambers of each distribution system portion are located forwardly of the hopper at a point conveniently located generally between the axes of the vehicle carrying the spreader apparatus, to achieve the advantages described above.

It will thus be seen that the objects hereinbefore set forth may readily and efficiently be attained and, since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A spreader apparatus to distribute materials at multiple locations in a preselected pattern comprising:

a hopper for holding a bulk supply of said materials having an opening for discharging said materials therethrough;

a forced gas supply for creating a gas flow;

an elongate, generally continuous metering roller disposed below said opening having a series of alternating axially extending raised ridges continuous along the length of said roller for blocking said materials and elongate axially extending recesses of uniform cross-section between the raised ridges for receiving said materials and for dispensing a metered quantity of said materials in a generally downward direction;

an elongate trough means below said metering roller to receive said metered quantity of said materials discharged therefrom;

a spaced array of discharge conduits, arranged in at least two staggered rows and disposed below said trough means for dividing and directing said gas flow into a plurality of smaller gas flows;

partition means dividing said trough means to form a plurality of individual compartments associated with respective ones of said discharge conduits so as to divide said metered quantity into a plurality of smaller metered quantities; and a plurality of internal nozzles at respective lower ends of said individual compartments, each protruding into a smaller gas flow through a respective discharge conduit, said internal nozzles angled in a generally downstream direction and communicating with said discharge conduits to form a passageway directing said smaller metered quantities of said materials into said smaller gas flows for mixture therewith and for transport through said discharge conduits.

2. The spreader apparatus of claim 1 further comprising a second forced gas supply for creating a gas flow in a direction substantially opposite to that of the direction of flow of the one forced gas supply, a second plurality of discharge conduits for dividing the gas flow of said second forced gas supply and a second plurality of internal nozzles for receiving meter quantities of said materials and for directing said metered quantities of said materials for mixing with the divided gas flows of the second forced gas supply.

3. The spreader apparatus of claim 2 further comprising a pair of opposed boom means disposed on either side of said metering roller and supporting respective pluralities of said discharge conduits.

4. The spreader apparatus of claim 1 further comprising a chain conveyor disposed within said hopper at a bottom portion thereof having chain links carried along an endless path for trapping portions of said material between successive chain links, with at least a portion of said chain conveyor disposed to at least partially overlie said opening, a cover above the first portion of said conveyor to at least retard the conveying of said material away from said opening in a first length of said chain as material trapped between the links of a second length of said chain is carried toward said opening.

5. The spreader apparatus of claim 1 wherein said compartments further comprise first and second panels disposed adjacent an upper end of said compartments, said panels joined together form a generally V-shaped cross-section with an upwardly opening-shaped recess for receiving said quantities of material, and one of said panels including an aperture through which said metered materials passes toward said nozzle means.

* * * * *

UNITED STATES PATENT AND TRADEMARK OFFICE
CERTIFICATE OF CORRECTION

PATENT NO. : 4,852,809

DATED : August 1, 1989

INVENTOR(S) : Harold A. Davis and Gerald B. Saude

It is certified that error appears in the above-identified patent and that said Letters Patent is hereby corrected as shown below:

In col. 2, line 68, before "10-10" change the word "lines" to --line--.

IN THE CLAIMS:

In col. 10, line 56, change the word "meter" to --metered--.

In col. 12, line 7, change the word "materials" to --material--.

Signed and Sealed this

Eleventh Day of September, 1990

Attest:

HARRY F. MANBECK, JR.

Attesting Officer      Commissioner of Patents and Trademarks